(12) United States Patent
Mathi et al.

(10) Patent No.: US 8,965,560 B2
(45) Date of Patent: Feb. 24, 2015

(54) STORAGE AND PICKING SYSTEM

(75) Inventors: Franz Mathi, Gleisdorf (AT); Klaus Uller, Feldbach (AT)

(73) Assignee: Knapp AG, Hart (AT)

( * ) Notice: Subject to any disclaimer, the term of this patent is extended or adjusted under 35 U.S.C. 154(b) by 65 days.

(21) Appl. No.: 13/701,012

(22) PCT Filed: May 30, 2011

(86) PCT No.: PCT/EP2011/058789
§ 371 (c)(1),
(2), (4) Date: Nov. 29, 2012

(87) PCT Pub. No.: WO2011/151275
PCT Pub. Date: Dec. 8, 2011

(65) Prior Publication Data
US 2013/0073076 A1    Mar. 21, 2013

(30) Foreign Application Priority Data

Jun. 1, 2010 (AT) .................................. A 898/2010

(51) Int. Cl.
*G06F 7/00* (2006.01)
*B65G 1/137* (2006.01)

(52) U.S. Cl.
CPC ............ *B65G 1/1376* (2013.01); *B65G 1/1378* (2013.01)
USPC ........... 700/216; 700/213; 700/214; 700/219; 700/223; 700/230

(58) Field of Classification Search
None
See application file for complete search history.

(56) References Cited

U.S. PATENT DOCUMENTS

| 2009/0299521 A1 | 12/2009 | Hansl et al. |
| 2011/0142581 A1 | 6/2011 | Freudelsperger |
| 2011/0144798 A1 | 6/2011 | Freudelsperger |
| 2011/0150612 A1 | 6/2011 | Gruber et al. |
| 2011/0170998 A1 | 7/2011 | Winkler |

FOREIGN PATENT DOCUMENTS

| AT | 412 153 B | 10/2004 |
| DE | 197 19 651 A1 | 6/1998 |
| DE | 19719651 A1 * | 6/1998 |

(Continued)

*Primary Examiner* — Yolanda Cumbess
(74) *Attorney, Agent, or Firm* — Dickstein Shapiro LLP

(57) ABSTRACT

A method for order picking products in an order picking facility having at least one rack for storing products and an assigned warehouse transport system for collecting and storing the products and for transferring the collected products to a transport system, by means of which the collected products are transported to a good-to-picker order picking station, at which the quantity of the collected products that is determined in a picking order is order-picked manually or automatically by a robot, into one order transport unit for each picking order. Product types corresponding to the picking order are collected, order-picked at the good-to-picker order picking station, one after the other, and the remaining products of the product type are stored via the transport system again in the rack. The warehouse transport system further transfers collected products via at least one through-channel to an intermediate storage site of a order picking station, from where collected products are manually or automatically by robot, supplied to a central belt assembly on a central belt. Irrespective of whether a product is to be order picked at the good-to-picker order picking station or at the order picking station, the product is collected from the same storage site of the rack.

13 Claims, 6 Drawing Sheets

(56) References Cited

FOREIGN PATENT DOCUMENTS

| DE | 297 24 039 U1 | 11/1999 |
|---|---|---|
| DE | 101 36 354 A1 | 2/2003 |
| EP | 0 213 360 A1 | 3/1987 |
| EP | 0 847 939 A1 | 6/1998 |
| EP | 1 099 652 A1 | 5/2001 |
| EP | 1 452 462 A2 | 9/2004 |
| EP | 2 186 754 A1 | 5/2010 |
| WO | WO 2006/042347 A2 | 4/2006 |
| WO | WO 2009/121090 A2 | 10/2009 |
| WO | WO 2010/017872 A1 | 2/2010 |
| WO | WO 2010/017873 A1 | 2/2010 |
| WO | WO 2010/022832 A1 | 3/2010 |

\* cited by examiner

STORAGE AND PICKING SYSTEM

BACKGROUND OF THE INVENTION

The invention relates to a method for order picking products in an order picking facility having at least one rack for storing the products and an assigned warehouse transport system for collecting and storing the products and for transferring the collected products to a transport system, by means of which the collected products are transported to a good-to-order picking station, at which the quantity of the collected products that is determined in a picking order is manually or automatically by a robot, respectively, order-picked into one order transport unit for each picking order, wherein product types corresponding to the picking order are collected, order-picked at the good-to-picker order picking station (WZM1) one after the other and wherein the remaining products of the product type are re-stored via the transport system again in the rack.

The invention further relates to an order picking facility for order picking products, wherein the order picking facility has at least one rack for storing the products and a warehouse transport system assigned to the rack for collecting and storing the products and for transferring the collected products to a transport system and wherein there is provided a warehouse administration computer for controlling the order picking facility, and wherein there is provided a good-to-picker order picking station, at which the quantity of the collected goods that is determined in a picking order may be order picked in one order transport unit for each picking order, wherein product types corresponding to the picking order may be collected by the warehouse transport system, order picked at the good-to-picker order picking station and wherein products of the product type remaining after the order picking may be re-stored via the transport system in the rack.

Such a method and such an order picking facility are, for example, known from the document DE 101 36 354 A1. The known system comprises several high racks of a high-rack storage, between which there is formed a lane width, in which there is provided respectively one warehouse transport system in order to store or collect the products stored in the high-rack storage. Each of the warehouse transport systems has one level operating tool per rack level, by means of which the products to be collected are picked up at storage sites and transferred to a lift of the transport system. By means of conveyor belts of the transport system, collected products are conveyed to the good-to-picker order picking station, at which an operator takes the quantity of the product type of the collected product that is determined for a picking order and places this into an order container or an order transport unit, respectively, of the picking order. A warehouse administration computer of the order picking facility controls the warehouse transport systems and the transport system so that all products that are to be order picked for a picking order are collected from the high-rack storage one after the other and transported to the good-to-picker order picking station. The operator then only has to take out the quantity of the product type of the collected products that is displayed on a monitor or by light symbols and put these into the order container A. Collected products remaining after the order picking will then be re-stored in the high-rack storage, controlled by the warehouse administration computer.

In the known method for order picking and the known order picking facility it has been proven that this way of good-to-picker order picking may be rather satisfyingly applied for certain picking orders. It is, however, disadvantageous that for certain product types or certain product characteristics (e.g., turn-over frequency, product geometry), respectively, or in order to obtain high order picking through-put performances for certain picking orders or parts of certain picking orders there may be applied order picking systems that are more suitable than the good-to-picker order picking system. Order picking by means of central belt technology, for example, has been rather successfully used for the order picking of, e.g., medicinal products. In central belt technology, there is provided a completely different storage system according to the state of art, which is why in known order picking facilities there has to be decided immediately after the delivery of the products by truck or rail, how the products are to be finally order picked in order to determine the suitable storage type in the order picking facility.

SUMMARY OF THE INVENTION

Hence, it is the task of the present invention to provide a method for order picking products and an order picking facility, wherein there is to be obtained as much flexibility as possible in regard to the way how the products are to be order picked and in regard to the order picking through-put performance required for each picking order as well as in regard to storage and order picking costs.

According to the invention, this task is solved in a method for order picking by the warehouse transport system transferring the collected products via at least one through-channel to an intermediate storage site of an order picking station of a central belt assembly, from where the collected products are manually or automatically by a robot, respectively, transferred to the central belt assembly for order picking on a central belt of the central belt assembly, and by the product, irrespective of whether a product is to be order picked at the good-to-picker order picking station or at the order picking station of the central belt assembly, being collected from the same storage site of the rack.

According to the invention, this task is solved in an order picking facility by the rack having at least on through-channel and intermediate storage site of an order picking station of a central belt assembly of the order picking facility that is provided at the side of the rack opposite to the warehouse transport system and by the warehouse transport system being adapted to transfer collected products via the through-channel to the intermediate storage site, at which the collected products may be supplied to a central belt assembly of the order picking facility for order picking on a central belt of the central belt assembly, and by the warehouse transport system, irrespective of whether a product is to be order picked at the good-to-picker order picking station or at the order picking station of the central belt assembly, being adapted to collect the product from the same storage site of the rack.

In this way there is achieved that all products that are to be stored and order picked in the order picking facility may be stored in the high-rack storage having one or several racks or in a carrousel storage, wherein advantageously there must not be made the decision yet how the stored products are to be order picked later on. The stored products may be transported from the respective storage sites in the high-rack storage or the carrousel storage with the warehouse transport system and the transport system to the good-to-picker order picking station, if this way of order picking makes sense for these products and for the required order picking through-out performance. Advantageously, the products stored in the high-rack storage or the carrousel storage may, however, be transferred directly via through-channels to intermediate storage sites of the order picking station of the central belt assembly, from where an operator or a robot may order pick the collected products using the central belt assembly. In this way of order picking, there are achieved very high order picking through-put performances.

It has proven to be especially advantageous to provide in addition a further type of an order picking station, this is a picker-to-good order picking station, in the order picking facility. At this picker-to-good order picking station all product types and in particular so-called fast moving products may be especially well order picked. By making provision of at least two or up to four, respectively, different types of order picking stations in an order picking facility, there is obtained especially much flexibility for the effective processing of orders. Thereby, there is advantageously achieved, among others, that switching from one storage system of an order picking type to the storage system of another order picking type is not necessary, if the picking order or a part of the picking order are to be processed using the other order picking type. By providing only one central storage system there is further obtained the advantage that there is provided high product availability due to prompt transferral and short distances from the respective storage site in the rack to the order picking station and return and due to uniform transport units for the products and that costs are being saved.

BRIEF DESCRIPTION OF THE DRAWINGS

The further embodiments and advantages of the order picking facility according to the invention and the inventive method for order picking are illustrated in greater detail in the following by way of several exemplary embodiments depicted in the figures.

DETAILED DESCRIPTION OF THE PREFERRED EMBODIMENTS

Figure 1:
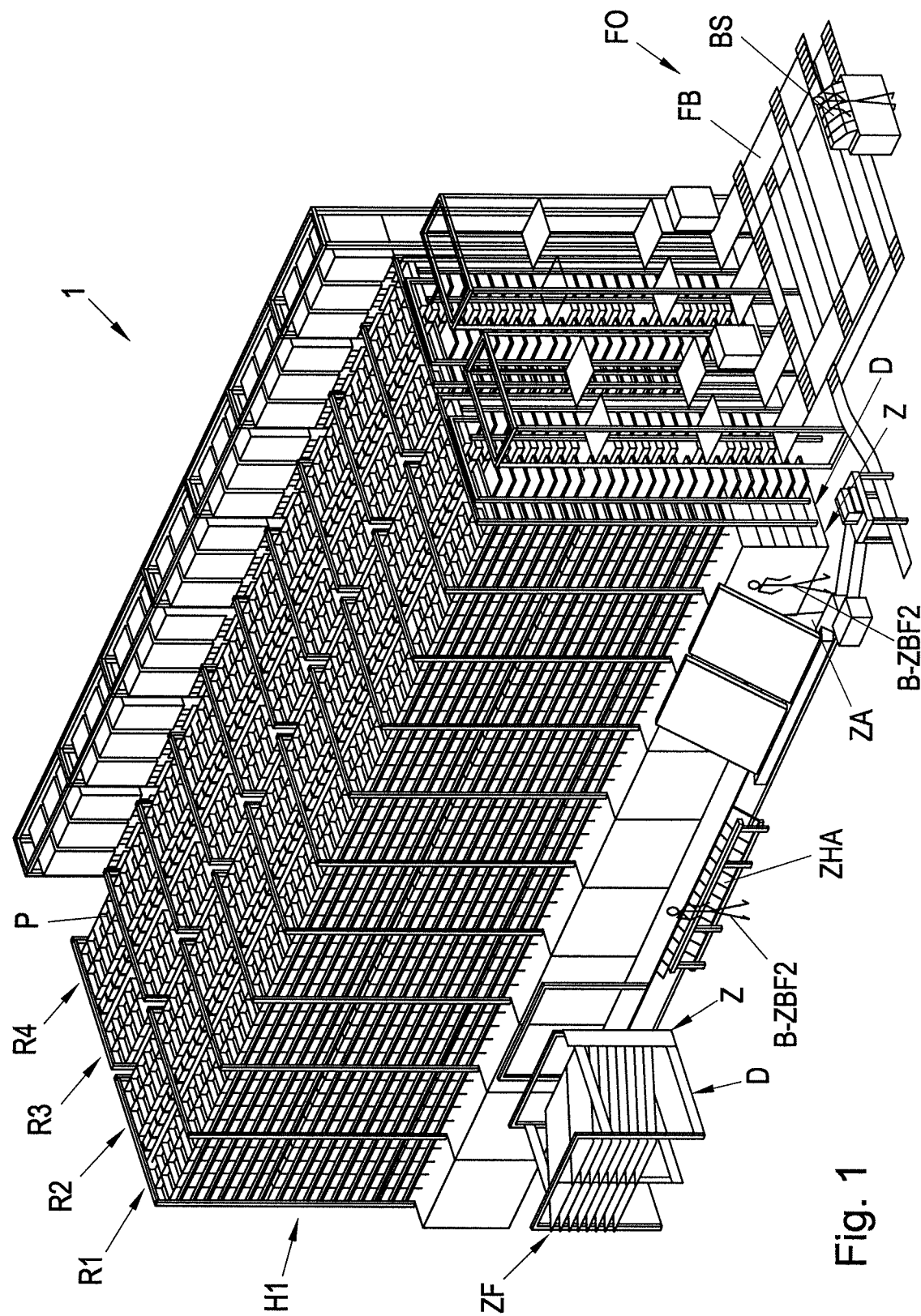
FIG. 1 shows a detail of an order picking facility in a first 3D view.

FIG. 1 shows a detail of an order picking facility 1 for order picking products P. "Order picking" is the compilation of the desired quantity of product P per desired product type of a picking order or purchase order, respectively, by a client. The different product types are delivered by truck or rail in large quantities to the picking order facility 1 and stored in a high-rack storage H1. In FIG. 1 there are displayed four high racks R1, R2, R3 and R4 of the high-rack storage H1, wherein each high rack has 23 levels one above the other and wherein in FIG. 1 there are displayed about 50 storage sites per high rack R1 to R4 in the longitudinal direction of the high-rack storage H1. The high-rack storage H1 depicted in FIG. 1 further has a so-called double-depth storage, wherein each rack R1 to R4 is formed by a double rack, in which two storage sites are arranged one behind the other. An inventive order picking facility may, however, also have simply single-depth storage or also more than double-depth storage.

Figure 2:
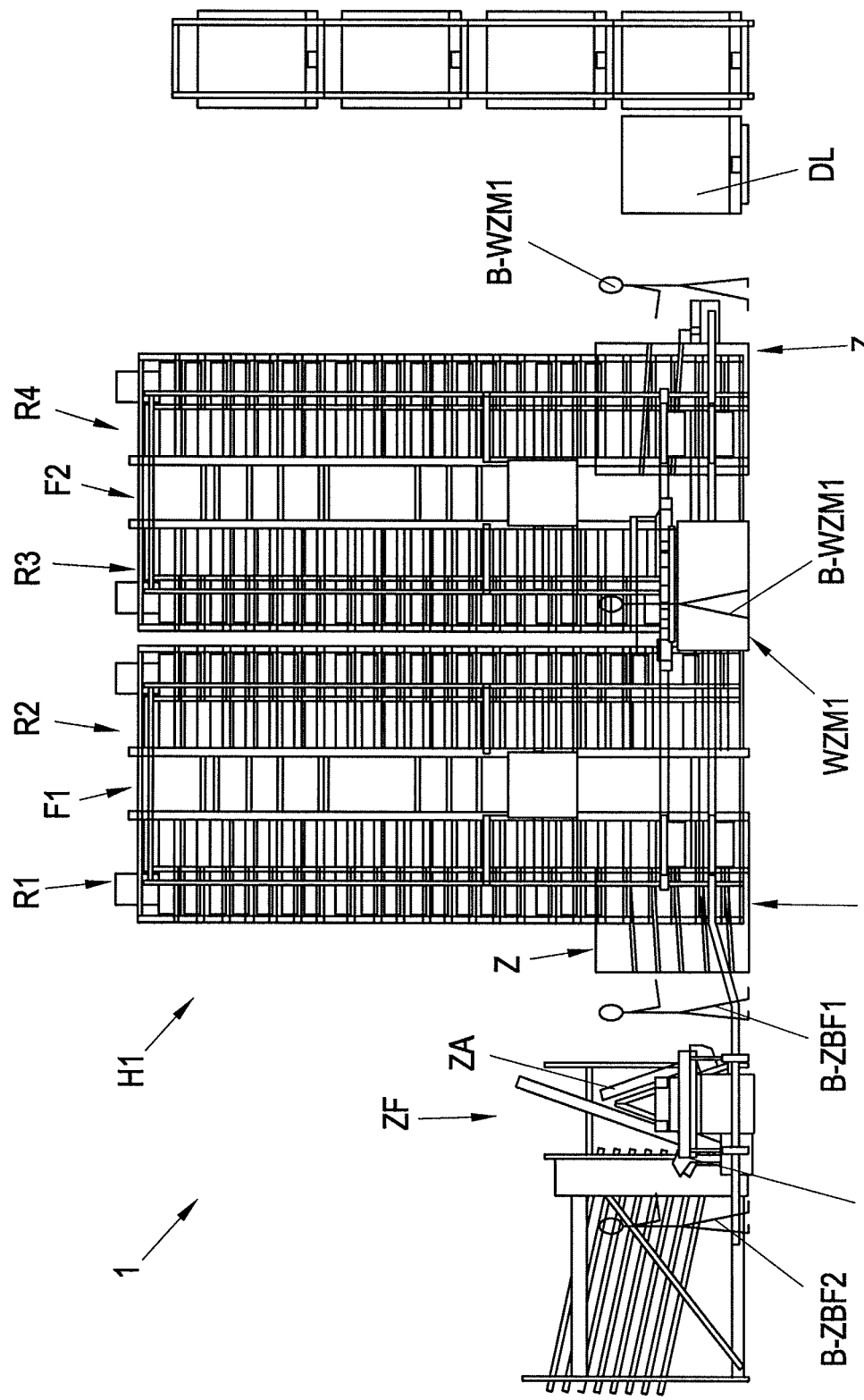
FIG. 2 shows the order picking facility according to FIG. 1 in a side view.
Figure 3:
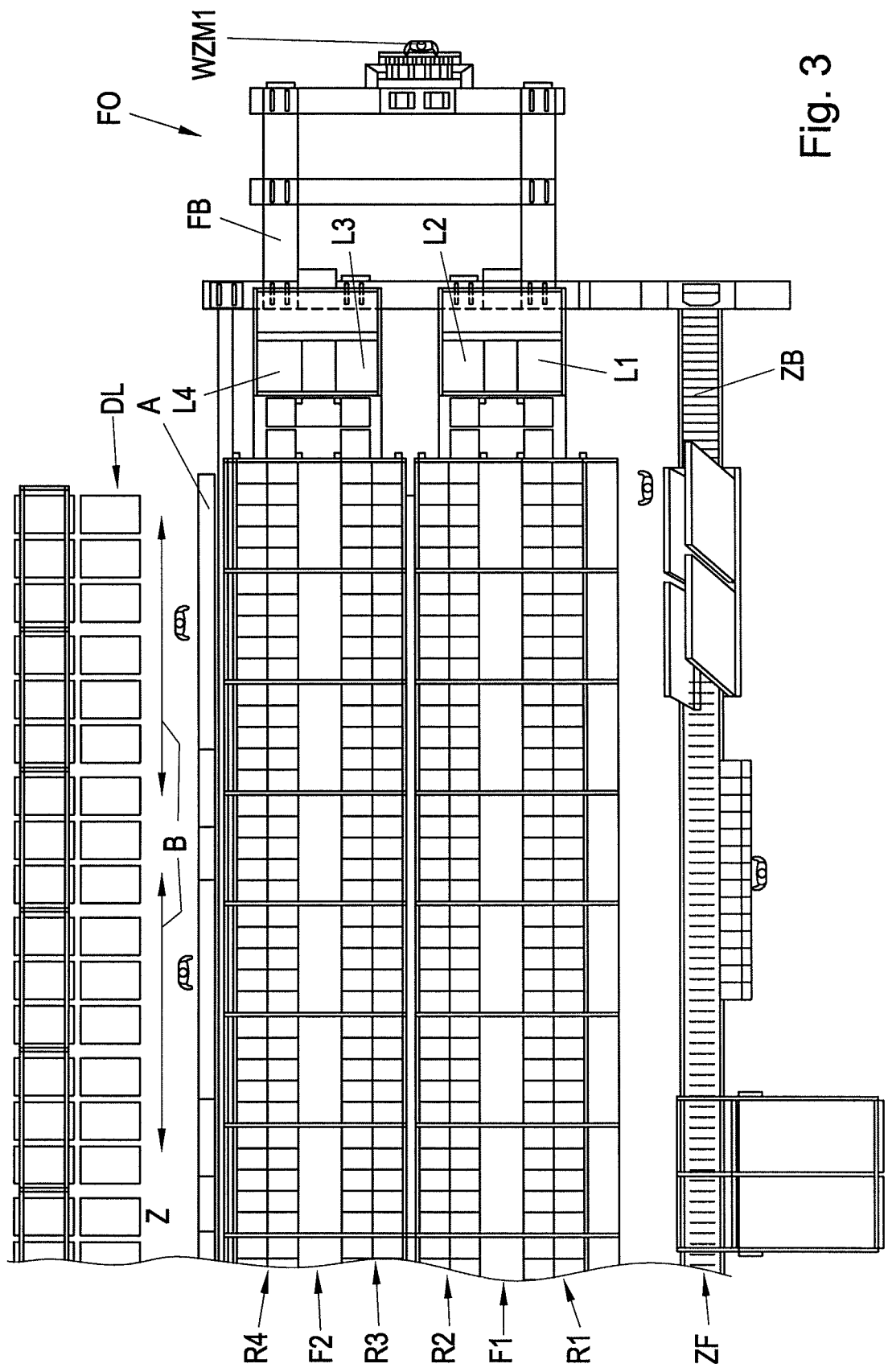
FIG. 3 shows the order picking facility according to FIG. 1 in a top view.

FIG. 2 shows the picking order facility 1 according to FIG. 1 in a side view, and FIG. 3 in a top view. In FIG. 2 there are displayed a first lane width F1, which is formed between the two high racks R1 and R2, and a second lane width F2, which is formed between the two high racks R3 and R4. In the lane widths F1 and F2 there are provided warehouse transport systems not depicted in detail in the figures, having one level operating tool for each rack level. The products P per each product type are stored in the individual storage sites on warehouse transport units, which are collected by the level operating tool including all products P situated thereon from the storage site and which are then transferred to a transport system FO. The transport system FO is formed by a lift L1 to L4 for each high rack R1 to R4 and by conveyor belts FB. Such a warehouse transport system including all level operating tools is disclosed, e.g., in DE 101 36 354 A1, which is why explanation thereof may be omitted in these exemplary embodiments.

A warehouse administration computer not illustrated in the figures is provided to assign one or several suitable storage sites in the high-rack storage H1 to each product type delivered to the order picking facility 1 and to store the products P via the transport system FO and the warehouse transport system on the assigned storage site/s. The warehouse administration computer further receives picking orders, which are then processed according to a subsequently described method for order picking of products P.

The order picking facility 1 thus further has a so-called good-to-picker order picking station WZM1, which is characterized in that the products to be order picked are collected from the high-rack storage H1, controlled by the warehouse administration computer, and are then transported to the "person" or the operator B-WZM1. On a monitor BS, the operator B-WZM1 may read what quantity of products P of the respective product type is to be order picked and then places this quantity of the products P into an order container A assigned to this picking order, which forms an order transport unit. The products P that remain on the warehouse transport unit after the order picking are then transported by the warehouse administration computer by way of the transport system FO and the warehouse transport system to the storage site in the high-rack storage H1 and then stored there.

It is also possible that light symbols instead of the monitor BS display the quantity of the products to be order picked, and the operator may also be informed accordingly by way of voice output or using 3D glasses. It is especially advantageous to make provision of a robot or robot arm, respectively, that is controlled by the warehouse administration computer instead of the operator, which robot takes out the products P to be order picked in the right quantity at the good-to-picker order picking station and places them into the order container A. The order containers A may be formed as cardboard box or other vessels.

The order picking facility 1 further has no storages sites but rather a through-channel D in the lowest five rack levels of the rack RI for each rack storage site, wherein the end of the through-channels D forms intermediate sites Z for shelves. In these five rack levels, the rack R1 is widened at the side opposite to the lane width F1 in order to provide for sufficient space for the intermediate storage sites Z of collected products P. The order picking facility 1, hence, further has a central belt assembly ZF having a central belt ZB and several order picking stations. In the figures, there are depicted, however, only one order picking station ZBF1 having one central belt machine ZA and one order picking station ZBF2 having one central belt semi-machine ZHA. The through-channels D herein form the immediate connection of the high-rack storage H1 with the central belt assembly ZF.

An operator B-ZBF1 for the order picking station ZBF1 takes out products P from the intermediate storage sites Z and charges the central belt machine ZA therewith. Here, the operator B-ZBF1 does not order pick any picking orders but rather refills the product types order picked by the central band machine ZA in the central belt machine ZA. The central belt machine ZA order picks, controlled by the warehouse administration computer, automatically onto the central belt ZB, which will be explained in greater detail in connection with the explanation of the method for order picking products P. An operator B-ZBF2 for the order picking station ZBF2 takes out products P from the intermediate storage sites Z and places them into the central belt semi-machine ZHA in accordance with a picking order. The central belt semi-machine ZA order picks, controlled by the warehouse administration computer, at a determined point of time the products P placed in the central belt semi-machine ZHA onto the central belt ZB, wherein the explanation of the method for order picking products P is omitted.

It could be mentioned that there may also be provided only in the lowest rack level or also, for example, in the lowest ten rack levels, through-channels and intermediate storage sites.

Figure 4:
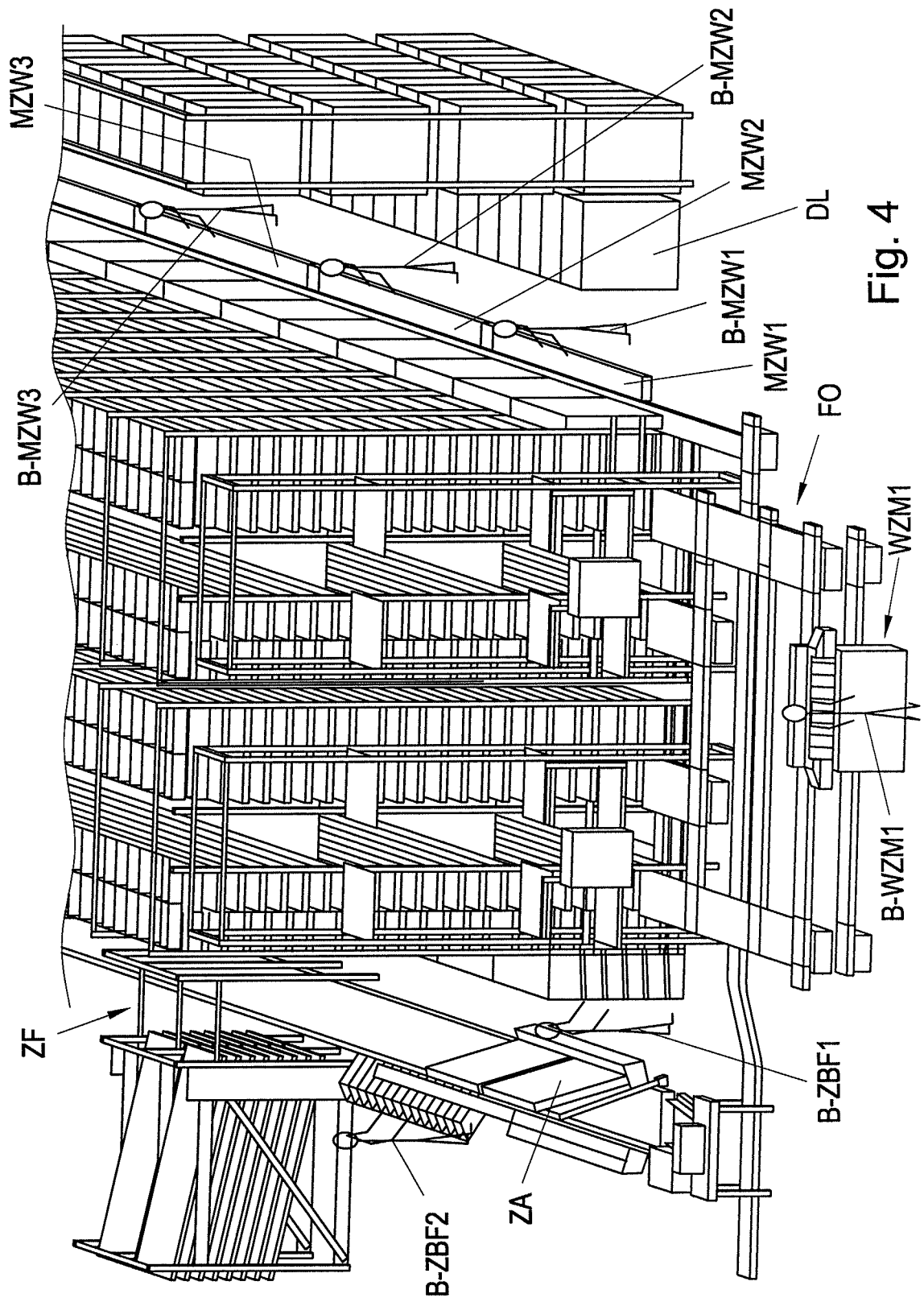
FIG. 4 shows the order picking facility according to FIG. 1 in a second 3D view.

FIG. 4 shows the order picking facility 1 according to FIG. 1 in a second 3D view, wherein there are depicted picker-to-good order picking stations MZW1 to MZW3 that are provided at the external side of the high rack R4. A picker-to-good order picking station is characterized in that an operator B-MZW1 to B-MZW3 takes out products P from the area B assigned thereto from intermediate storage sites Z of the picker-to-good order picking station or from permanent storage sites DL and puts them, according to the respective picking order, into an order container A. The person or operator, respectively, B-MZW1 to B-MZW3, herein, has to cover shorter distances in the area B and has to walk to the products P to be order picked in order to get these, wherein the explanation of the method for order picking products P is omitted herein.

It is especially advantageous to make provision also in this order picking station of a robot or robot arm, respectively, that is controlled by the warehouse administration computer, instead of the operator, which robot takes out the products P to be order picked in the correct quantity at the picker-to-good order picking station and puts them into the order container A. A so-called ABB "Spider Robot" could be used for this purpose, for example.

Figure 5:
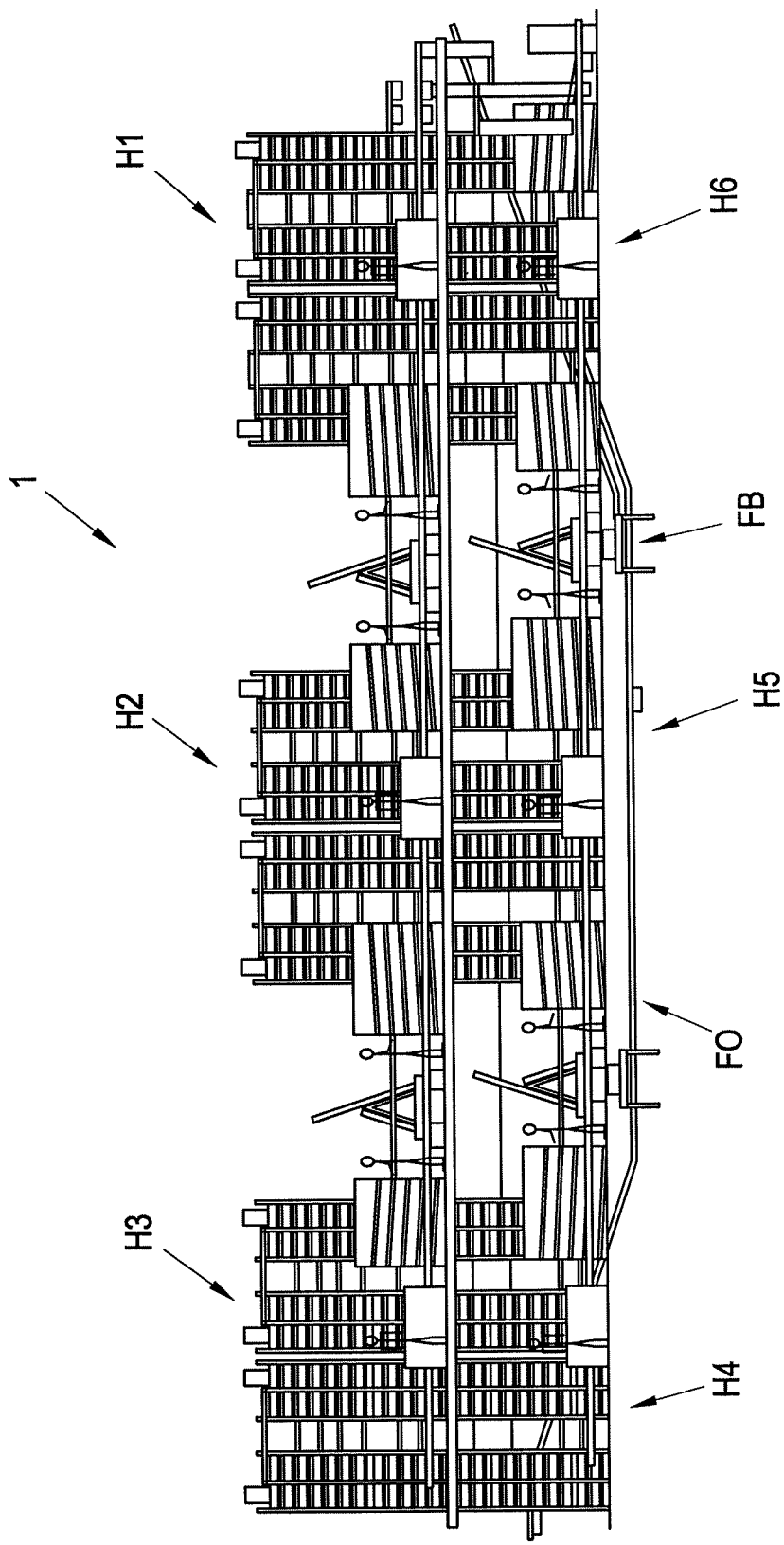
FIG. 5 shows the entire order picking facility according to FIG. 1 in a side view.

FIG. 5 shows the entire order picking facility 1 according to FIG. 1 in a side view, wherein six high-rack storages H1 to H6 are arranged in two levels one above the other. The transport system FO connects the individual high-rack storages H1 to H6 and order picking stations with each other, wherein parts of the transport system FO are arranged under-ground. Such an order picking facility 1 may be composed of any number of high racks and assigned order picking stations in a modular way in several levels one above the other and in any number of modules next to each other with the high racks having any possible length. This modular structure provides for as much flexibility as possible in regard to the size of the order picking facility 1 as well as in regard to the type of order picking products that has to be selected for the respective picking order.

In the following, there is explained in greater detail the method for order picking products P in the order picking facility 1 by way of individual examples. According to a first exemplary embodiment, there is assumed that a truck has delivered a load of different product types, according to the example medicinal products. The types of different medicinal products are entered in the data base of the warehouse administration computer, or these have already been transmitted by the supplier in an electronic way. The warehouse administration computer is the administrator of a data base, in which there is indicated in regard to each storage site in the high-rack storages H1 to H6 which product type and quantity of the products P are stored on the storage site. The warehouse administration computer thus is adapted to assign a storage site to each product type to be stored or to each product P to be stored, respectively, which is determined in view of how this product type (e.g., product form) may usually or most successfully be order picked in order to minimize storing and collecting distances or storing and collecting times, respectively, of the warehouse transport system. It may also be distinctive whether a product type is delivered and newly stored or is re-stored in the racks as a return product. Hence, if a product type such as, e.g., a box of painkillers, is most efficiently and, as a consequence, also most frequently order picked by way of the central belt assembly ZF, then the warehouse administration computer assigns a storage site in the rack or high-rack R1 or R2 at the lane width F1 to this product type. This is herein advantageous as, if the central band machine ZA runs out of painkillers and these have to be re-stored, there is to be covered a relatively short distance by the warehouse transport system in order to convey the warehouse transport unit with ,e.g., 1,000 boxes of painkillers in the through-channel D and from there into the intermediate storage site Z of the order picking station ZBF1. Similarly or additionally, respectively, the warehouse administration computer may also determine the storage site for the painkillers in regard to how often the painkillers will be presumably order picked, this is the size of the collecting frequency for this product type. Product types that are to be collected more frequently, might be stored in the lower rack levels and nearer to the order picking stations in storage sites of the high-rack storage H1.

The refilling of the central belt machine ZA would be carried out according to the above example so that the central belt machine ZA transmits the information to the warehouse administration computer that the central belt machine ZA will run out of boxes of painkillers. Hereupon, the warehouse administration computer would control the warehouse transport system in a way so that the warehouse transport unit with the painkillers reaches the intermediate storage site Z via the through-channel D. The operator B-ZBF1 would then receive an order displayed on the monitor that the boxes of painkillers are to be moved from the intermediate storage site Z into the central belt machine ZA. Either all of the boxes of painkillers situated on the warehouse transport unit are transferred in the central belt machine ZA, or the remaining ones on the warehouse transport unit are then transported back to the storage site as return products, controlled by the warehouse administration computer. Similarly, also the warehouse transport unit with the remaining boxes of painkillers could remain stored in the intermediate storage site Z for one of the subsequent picking orders.

The order picking of a picking order using the central belt assembly ZF is carried out so that a customer order for a pharmacy or a picking order, respectively, has nine boxes of painkillers and three boxes of ointment. This picking order is then transmitted to the warehouse administration computer, and the warehouse administration computer determines that these two product types are situated in the central belt machine ZA and, hence, may be order picked there rather easily and efficiently. The warehouse administration computer thus virtually determines an area on the central belt ZB that is moving permanently at a velocity of about one metre per second, onto which this picking order is to be order picked. Once this virtual area is positioned underneath the central belt machine ZA, when the painkillers are discharged, the central belt machine ZA, controlled by the warehouse administration computer, will order pick nine boxes of the painkillers onto the central belt ZB. Once this virtual area of the picking order, on which there are already situated the nine boxes of painkillers, passes the discharge of the boxes with ointment, the central belt machine ZA will order pick in addition the three boxes of ointment, whereby the order picking of the picking order will be finished. At the end of the central belt the order picked boxes are introduced into an order container A for this picking order and from there prepared for dispatch with the transport system or transported to one of the other order picking stations of the order picking facility 1 for processing another partial picking order. Thereby, there is obtained the advantage that the product type of small boxes for medicinal requirements—and in particular requirements of pharmacies—have been flexibly and efficiently order picked by the central belt machine ZA of the central belt assembly ZF.

According to a further exemplary embodiment, there is assumed that there have been ordered five rather rarely ordered boxes of herbal tincture and two rather rarely ordered boxes of nose drops and one packet of painkillers. The warehouse administration computer controls the warehouse transport system and the transport system to get the warehouse transport unit with the boxes of herbal tincture and the boxes of nose drops from the high rack R1 and R2 and to transport via the through-channel D into one of the intermediate storage sites Z at the order picking station ZBF2 by way of the central belt semi-machine ZHA. The operator B-ZBF2 then takes five boxes of herbal tincture and two boxes nose drops and puts these into the central belt semi-machine ZHA and confirms the picking order. Subsequently, the warehouse administration computer again determines an area on the central belt ZB and order picks onto this area the box of painkillers from the central belt machine ZA as well as the five boxes herbal tincture and two boxes nose drops. In this way, there is advantageously obtained an especially flexible way to order pick picking orders using the most efficient available way.

According to a further exemplary embodiment, there are to be order picked a determined quantity each of three different product types, which may be order picked most efficiently with the good-to-picker order picking method. Advantageously, the warehouse administration computer may determine by way of the respective picking order where every part is to be order picked and the warehouse transport system and the transport system may be controlled accordingly. In this case, the warehouse administration computer controls the warehouse transport system and the transport system in order to collect the shelves having the three product types in a sufficient quantity from the high-rack storage H1 and to provide thereof one after the other at the good-to-picker order picking station WZM1. The operator B-WZM1 is displayed on the monitor BS how many pieces of which product type are to be taken from the warehouse transport unit and to be put into the order container A of the picking order. Products of the product types remaining on the shelves are then re-stored in the storage sites assigned thereto, controlled by the warehouse administration computer. The order container A that is filled with the products P of the picking order is transported via the transport system FO to the dispatch or to one of the other order picking stations. Similarly, it would be possible and advantageous to intermediately store a product type that is statically collected from the high-rack storage H1 next to the good-to-picker order picking station WZM1 over longer periods of time, for example, if the warehouse administration computer recognizes by way of the picking orders to be processed within the next couple of hours and days that this product type is very frequently required at the good-to-picker order picking station WZM1. In this way, capacity of the transport system FO and of the warehouse transport system for storing and collecting this product type may be saved.

According to a further exemplary embodiment, there are to be order picked products P, which are delivered in huge boxes or cardboards on pallets by a truck to the order picking facility 1. These pallets are then immediately conveyed by forklifts to one of the permanent storage sites DL and stored there. Further product types that are also stored in the high-rack storage H1 are also to be order picked for this client in the picking order. The warehouse administration computer decides on the basis of this information to order pick this picking order at the picker-to-good order picking station MZW1 and controls the warehouse transport system and the transport system FO accordingly to transport the product types of the picking order that are stored in the high rack H1 via a through-channel D into one intermediate storage site Z per product type. The product types to be order picked in the picking order, hence, are available in parallel in neighbouring intermediate storage sites Z, and may be taken out from there. Hence, all collected products P of the picking order that are to be order picked at the picker-to-good order picking station MZW1 are intermediately stored during the period of time of the order picking per product type in one of the intermediate storage sites Z of the picker-to-good order picking station MZW1 and, therefore, may be order picked from these intermediate storage sites Z manually or also by a robot. If this is performed manually, then the operator B-MZW1 receives a picking order and takes the corresponding quantity of the products P from the intermediate storage sites Z and the permanent storage site DL in his/her area B and order picks the products P into an order container A of the picking order. Also in this exemplary embodiment, there is achieved for each picking order an essential advantage by determining the most suitable way of order picking for each picking order.

According to the exemplary embodiments described above, the warehouse administration computer has decided which way or which ways of order picking of a picking order are effected by the warehouse administration computer. It could be mentioned that this decision may also be taken by an operator, who takes this decision on the basis of the information on the picking order displayed by means of the warehouse administration computer and who enters this data in the warehouse administration computer.

The through-channels D and the intermediate storage sites Z for the order picking stations and the picker-to-good order picking stations are advantageously provided in the lower rack levels of the external high racks R1 and R4 of the high-rack storage H1, so that the operators B-ZBF1 and B-MZW1 may easily reach the intermediate storage sites Z in order to take out products. According on the height of the intermediate storage sites, also the lower rack levels herein may be formed by the lowest, e.g., three, five or even twenty rack levels of the rack.

According to the exemplary embodiment in FIGS. 1 to 5, the warehouse transport system is formed by one level operating tool for each rack level, which is advantageous for achieving a high order picking through-out performance. The warehouse transport system might also be formed by a rack operating tool moving in the lane width F1 and F2 and being adjustable in height. The rack operating tool might have only one pole across the entire rack heigh it might also have several pole tools one above the other. The warehouse transport system might further be formed by a carrousel. The transport system FO might also be formed by the rack operating tool, which moves without a driver in the lane width and which conveys the collected products P directly to one of the order picking stations. The transport system, however, might also be formed by a pallet conveyor technology or by overhead tracks.

Figure 6:
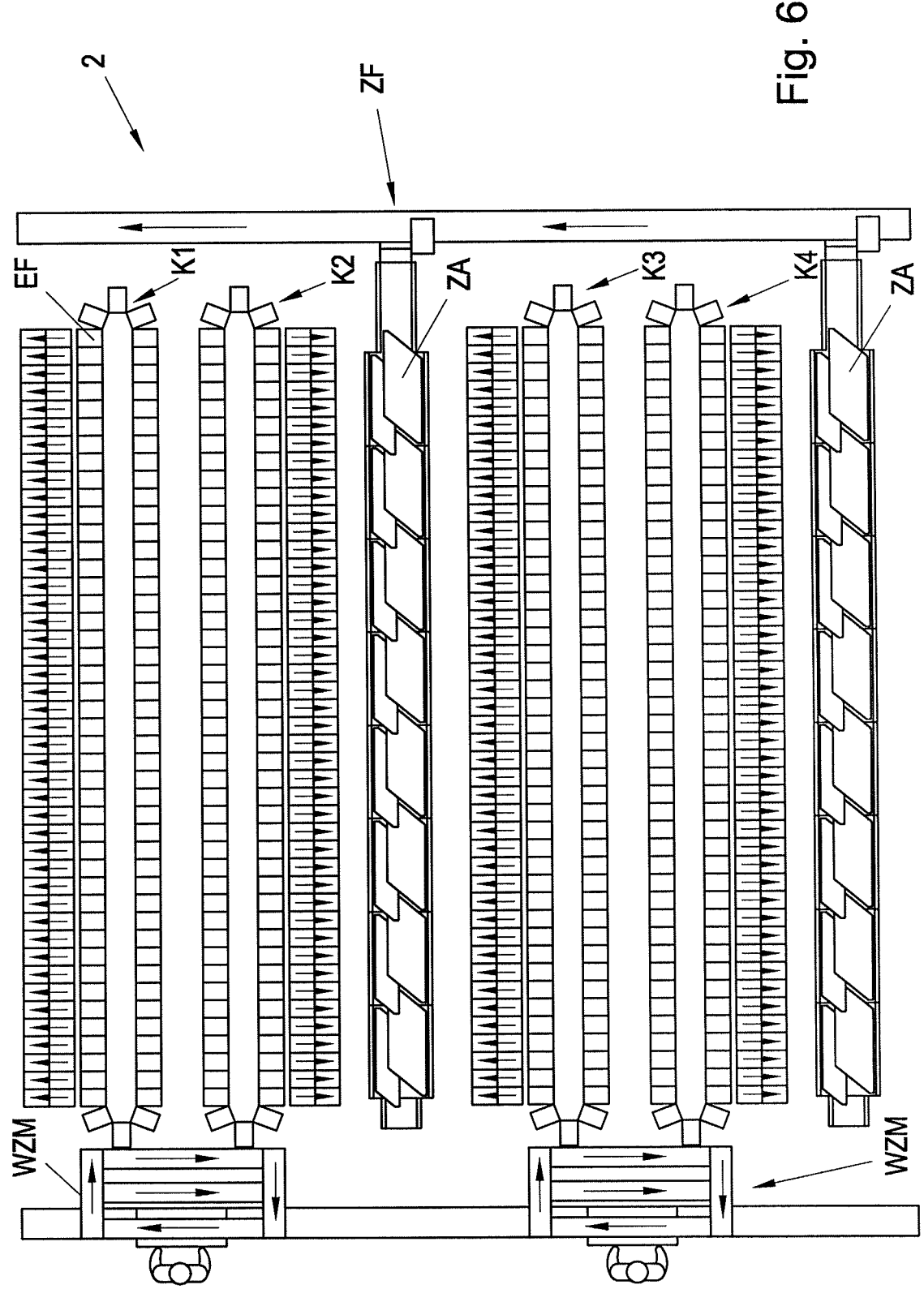
FIG. 6 shows a further order picking facility having carrousel storage in a top view.

In FIG. 6 there is illustrated a second embodiment of an inventive order picking facility 2, in which the products P are not stored in a high-rack storage but rather in a carrousel storage K1 to K4. The products P are stored on a continuous shelves chain EF. If a certain product P is to be collected, the continuous shelves chain EF is transported until the corresponding storage site is positioned at the transport system, in particular at the lift, or at a lifting arm, which is, e.g., positioned in the central area of the carrousel storage, in order to transport the warehouse transport unit with the product P to one of the order picking stations described above. The carrousel storage may also be configured in several levels one above the other as a high-carrousel storage.

In an inventive order picking facility, there is thus situated centrally in the middle at least one rack, in particular, however, a high-rack storage or a carrousel storage, in which a great number of different product types may be stored. At the edges of the central storage, there are situated different types of order picking stations, and depending on the picking order, there is to be selected the suitable way of order picking or to be combined the suitable ways of order picking in order to process the picking order as efficiently and quickly as possible.

It could be mentioned that order picking at the good-to-picker order picking station is performed mainly with products, which are supplied one after the other by the transport system to the good-to-picker order picking station, wherein the remaining products are intermediately stored statically or at least over a period of time of several hours or several days temporarily at the good-to-picker order picking station.

It could be mentioned that an order transport unit and a warehouse transport unit may be configured as a plastic container or as a cardboard box or as a tray or as a load carrier. It is further possible to use the warehouse transport unit also as an order transport unit. There is further to be mentioned that products P need not be stored on warehouse transport units in the racks but rather that the products P may, for example, also be directly stored.

It could be mentioned that for the transport of collected products P to the through-channels D of the order picking station, the transport system is advantageously not loaded but that the products P rather are directly transferred from the warehouse transport system into the through-channels D.

It could be mentioned that the products may be transported by means of force of gravity through the through-channel D into the intermediate storage site Z and these may also be driven electrically, hydraulically or pneumatically. There may further be provided subsequently to the through-channel D an intermediate storage site Z, or there may also be provided several intermediate storage sites Z.

It could be mentioned that a picking order may be carried out completely at one order picking station according to only one order picking type, that a picking order may, however, also be split in one, two or several partial picking orders. If this is the case, for example, a part of the picking order could be carried out at the order picking station and another part at the good-to-picker order picking station. There could also be carried out a partial picking order at the picker-to-good order picking station and another partial picking order could be carried out by the central belt semi-machine of the order picking station. According to the invention, thus advantageously any of the ways of order picking supported by the order picking facility may be used for order picking, wherein, among others, there is taken into account the order picking through-put performance as well as the storage and order picking costs. The way of order picking selected for a picking order may, for example, change in dependence on the season. Product types such as, e.g., painkillers or nose drops, could be very in demand in the cold seasons, so that these are included in the central belt machine of the order picking station and are more efficiently order picked at the good-to-picker order picking station in the warm season.

In order to store in the high rack H1 all kinds of product types in accordance with the requirements of the products P, there may, for example, be configured one of the racks R as a cooling rack in order to keep fresh deep-frozen products or normal refrigerated goods.

The invention claimed is:

1. A method for the order picking of products in an order picking facility, comprising:
   at least one rack for storing the products, and one assigned warehouse transport system for collecting and storing the products and for transferring the collected products to a transport system, wherein the transport system transports the collected products, to a good-to-picker order picking station;
   wherein the quantity of the collected products is determined in a picking order either manually or automatically by a robot;
   wherein the collected products are picked into an order transport unit per picking order;
   wherein product types corresponding to the picking order are collected and picked one after the other at the good-to-picker order picking station;
   wherein the remaining products of the product type are re-stored in the rack via the transport system;
   wherein the warehouse transport system further transfers collected products via at least one through-channel to an intermediate storage site of an order picking station of a central belt assembly;
   wherein collected products are picked manually or automatically by a robot, and supplied to the central belt assembly for order picking on a central belt of the central belt assembly; and
   wherein irrespective of whether a product is to be order picked at the good-to-picker order picking station or at the order picking station of the central belt assembly, the product is collected from the same storage site of the rack.

2. A method for the order picking according to claim 1,
   wherein the warehouse transport system further transfers collected products via through-channels to intermediate storage sites of a picker-to-good order picking station; and
   wherein all the collected products of a picking order that are to be order picked at the picker-to-good order picking station during the time period of the order picking per product type are intermediately stored in one of the intermediate storage sites of the picker-to-good order picking station and retrieved from these intermediate storage sites, said collected products are order picked manually or automatically by a robot into an order transport unit of the picking order.

3. A method for the order picking according to claim 1,
   wherein, at the good-to-picker order picking station, the products of an at least statically collected product type are order picked; and wherein the products are intermediately stored at the good-to-picker order picking station over a time period that includes the order picking of several picking orders.

4. A method for the order picking according to claim 1, wherein a central belt machine of the order picking station of the central belt assembly is filled with the collected products;
wherein the products are situated in the intermediate storage site of the order picking station of the central belt assembly manually or automatically by a robot;
wherein each picking order is automatically order picked to the central belt controlled by a warehouse administration computer; and
wherein, at the end of the central belt, the order picked products of each picking order are introduced each in an order transport unit.

5. A method for the order picking according to claim 1, wherein a central belt semi-machine of the order picking station of the central belt assembly is filled with collected products for each of the picking orders either manually or automatically by a robot, said collected products being situated in the intermediate storage site of the order picking station of the central belt assembly; and
wherein each picking order is order picked to the central belt, wherein at the end of the central belt, the order picked products of each picking order are introduced in an order transport unit.

6. A method for the order picking according to claim 1, wherein the order picking facility includes a warehouse administration computer, said warehouse administration computer assigns an appropriate storage site to each of the products to be stored, based on the product characteristics and the expected picking type, said storage assignment minimizes the storing and collecting distances or storing and collecting times of the warehouse transport system and to increase the order picking performance.

7. A method for the order picking according to claim 1, wherein the products are stored in a carrousel storage, and said products are moved on a continuous shelf chain and wherein the collected products are transferred by the warehouse transport system from the continuous shelf chain to either to the transport system or to any of the through-channels.

8. An order picking facility for the order picking of products, wherein the order picking facility comprises:
at least one rack for storing the products; and
a warehouse transport system that is assigned to the rack for collecting and storing the products and for transferring the collected products to a transport system;
the order picking facility further comprising a warehouse administration computer, wherein the warehouse administration computer controls the order picking facility;
the order picking facility further comprising a good-to-picker order picking station;
wherein the quantity of the collected products that is determined in a picking order may be order picked in one order transport unit per each picking order;
wherein product types corresponding to the picking order may be collected from the warehouse transport system and order picked at the good-to-picker order picking station one after the other;
wherein the products of the product type that are remaining after the order picking may be re-stored via the transport system in the rack;
wherein the rack has at least one through-channel and an intermediate storage site provided at the side of the rack opposite to the warehouse transport system;
wherein the warehouse transport system is adapted to transfer collected products via the through-channel to the intermediate storage site, wherein the collected products of a central belt assembly of the order picking facility may be supplied for order picking on a central belt of the central belt assembly; and
wherein the warehouse transport system is adapted to collect the products from the same storage site of the rack, irrespective of whether a product is to be order picked at the good-to-picker order picking station or at the order picking station of the central belt assembly.

9. An order picking facility according to claim 8, wherein the warehouse transport system is adapted to further transfer the collected products further via through-channels to intermediate storage sites of a picker-to-good order picking station, said intermediate storage sites are provided at the side of the rack opposite to the warehouse transport system; and
wherein the picker-to-good order picking station includes an intermediate storage site for each product type of a picking order, where said collected products are manually order picked from the intermediate storage site into one order transport unit for each picking order.

10. An order picking facility according to claim 8, wherein the rack includes a plurality of rack levels, wherein through-channels and the intermediate storage sites of the order picking station of the central belt assembly or the picker-to-good order picking station are provided in the lower rack levels of the rack.

11. An order picking facility according to claim 10, wherein at least two racks are arranged in parallel to form a high-rack storage and wherein the through-channels and the intermediate storage sites of the order picking station of the central belt assembly are provided in a first external rack delimiting the high-rack storage and that-wherein the through-channels and the intermediate storage sites of the picker-to-good order picking station are provided in a second external rack situated opposite to the first rack and delimiting the high-rack storage.

12. An order picking facility according to claim 8, wherein at least two racks with at least two rack levels form a lane width, and a level operating tool of the warehouse transport system is provided for each rack level; and
wherein the level operating tool is configured to store and collect products in the storage sites of the racks and to transfer the collected products to a lift of the transport system, wherein said lift conveys the collected products onto a conveyor belt level.

13. An order picking facility according to claim 8, further comprising a robot controlled by the warehouse administration computer at the good-to-picker order picking station and/or at the picker-to-good order picking station,
wherein the robot is adapted to order pick collected products;
wherein there is provided a robot controlled by the warehouse administration computer at the order picking station of the central belt assembly ; and
wherein said robot is adapted to order pick collected products in a central belt semi-machine and/or to fill a central belt machine with collected products.

* * * * *